Sept. 19, 1933.  W. G. WEHR  1,927,653
TRUCK BODY
Filed June 22, 1929   2 Sheets-Sheet 1

Inventor
William G. Wehr.
Kerr Hudson & Kent.
attys.

Sept. 19, 1933.  W. G. WEHR  1,927,653
TRUCK BODY
Filed June 22, 1929  2 Sheets-Sheet 2

Patented Sept. 19, 1933

1,927,653

UNITED STATES PATENT OFFICE 1,927,653

TRUCK BODY

William G. Wehr, East Cleveland, Ohio, assignor to The Cleveland Crane & Engineering Company, Wickliffe, Ohio, a corporation of Ohio Application June 22, 1929. Serial No. 373,006

8 Claims. (Cl. 214—82)

This invention relates to bodies for vehicles and more particularly to a dump body for motor vehicles which is simple in construction, efficient in operation, and inexpensive to manufacture.

One of the objects of the present invention is to provide a dump body, of the character referred to, in which the load is removed from the dump body without the necessity of raising the latter, thereby requiring less power for this purpose and enabling the operator to more readily handle and distribute the load.

Another object of the present invention is to provide a dump body in which the load may be distributed in portions on jobs where such distribution is required and, additionally, to permit the loading of the body in a similar manner for such distribution, loading the body at the rear end thereof and causing the same to be advanced towards the front portion of the body.

With the objects above indicated and other objects hereinafter explained in view, the invention consists in the combination and arrangements of parts hereinafter claimed.

Referring to the drawings,

Fig. 2 is a front end elevational view of the same;

Fig. 3 is a top plan view of the dump body; and

Fig. 4 is an enlarged fragmentary sectional view taken on line 4—4 of Fig. 3.

Figure 1:
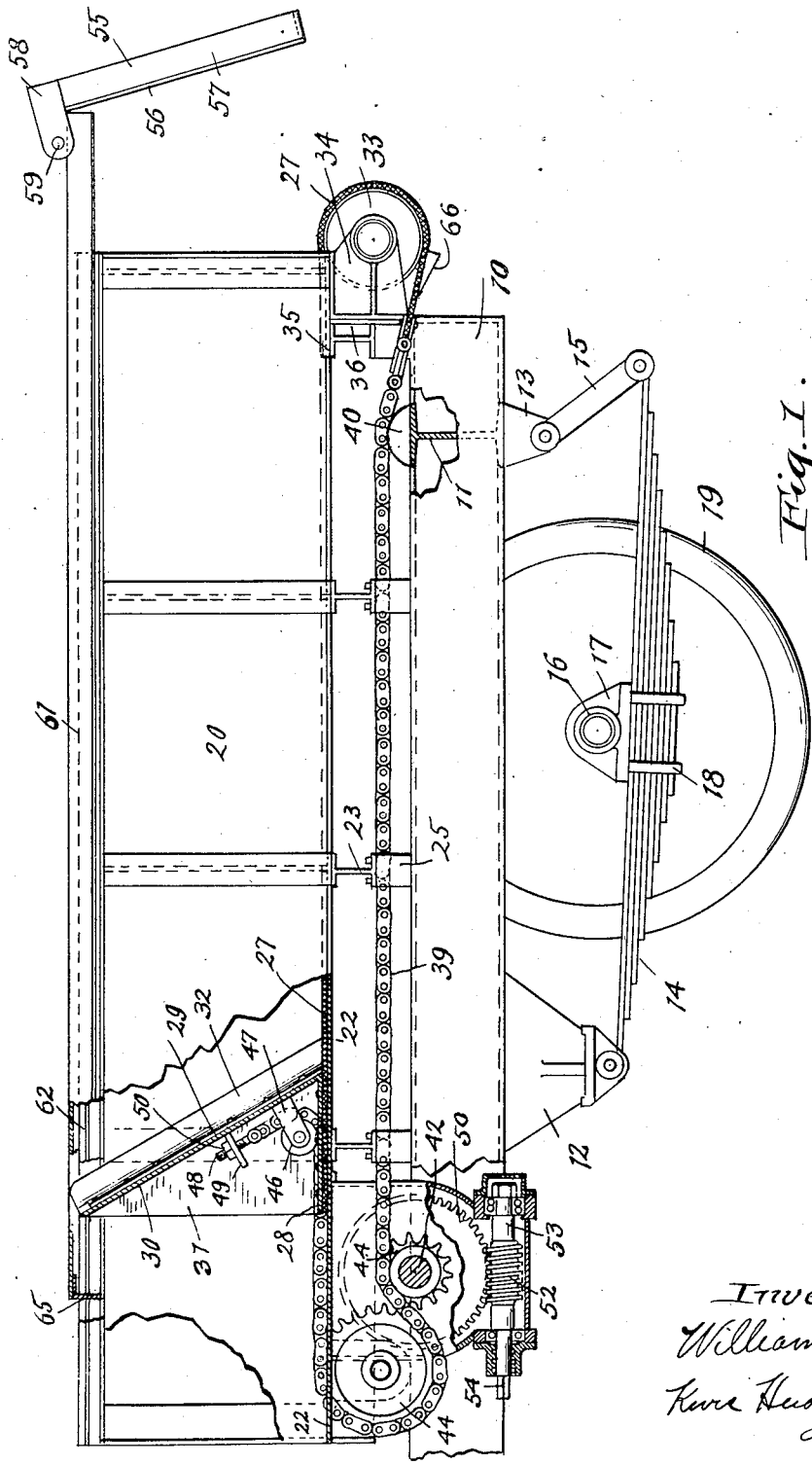
Fig. 1 is a side elevational view of the dump body, partly in section to show details embodying the present invention.

In the drawings, 10 represents the side channel members of the chassis frame which extend longitudinally and are spaced apart by transversely extending I-beams 11, one of which is herein shown, these members being preferably secured together as by welding to form a rigid structure. The side channel members 10 have attached to their undersides forward brackets 12 and rearward brackets 13. The forward brackets 12 have connected thereto the front ends of springs 14, while the rear ends of the springs 14 are connected to links 15 which are, in turn, connected to the rear brackets 13. An axle 16 extends transversely of the chassis frame and is supported by brackets 17, which in turn, are connected by U-bolts 18 to the springs 14, as shown in Fig. 1. The outer ends of the axle 16 support the usual traction wheels 19. Only one of each of the members heretofore described is illustrated in the drawings, but it is understood that this is of the usual construction and, as it forms no part of applicant's invention, it is not believed that further description is necessary. It is also understood that the motor vehicle is provided with the usual motor for transmitting power to the wheels 19 through the customary differential and usual speeds.

The dump body, which is represented generally by 20, comprises a pair of vertical side members 21 of sheet metal or other suitable material, which extend longitudinally for any distance depending upon the desired length of the dump body. These side members 21 are spaced apart any desired distance by a bottom plate 22 of steel or other suitable material, and the lower longitudinal edges of the side members 21 are welded to the longitudinal edges of the bottom plate 22 so as to provide a substantially channel-shaped body.

A plurality of I-beams 23 extend transversely of the dump body 20 and are spaced a suitable distance apart, longitudinally thereof, so as to rigidly support the bottom plate 22. The upper edges of the flanges of the I-beams 23 are welded or otherwise secured to the under side of the bottom plate 22 and have their ends projecting beyond the side members 21. Supported by the extended ends of the I-beams 23 are vertically extending uprights 24, preferably in the form of I-beams, which have their inner flanges abutting the side members 21 and secured thereto by welding or other suitable means, so as to rigidly reinforce the side members 21. The lower portions of the uprights 24 are also welded or otherwise secured to the upper surfaces of the extending portions of the I-beams 23. It will be noted that this construction affords a very rigid structure.

The I-beams 23, carrying the dump body 20, are supported upon the side channel members 10 of the chassis frame and are spaced apart therefrom by spacers 25 of metal or other suitable material, and the lower flanges of the I-beams 23 are securely bolted at 26, to the upper flanges of the side channel members 10, the bolts extending through the spacers 25. It will be noted, therefore, that the body 20 is rigidly connected to the chassis frame, thereby providing a much more rigid structure than is possible in the types of dump bodies where the body has to be elevated about a pivot to discharge the load therefrom. The latter type of dump body is very inefficient in view of the fact that the center of gravity is raised considerably when the load is in the process of being discharged, and in many instances where it is necessary to discharge the load on a slope, the truck is very liable to tip over on account of the increasing height of the body. In the present construction, the body being rigidly secured to the chassis frame maintains the center of gravity quite low at all times and these disadvantages heretofore referred to are very conveniently overcome.

It should be here stated that the system of discharging the load from the body 20 is by causing the load to be moved bodily within the body 20 and any suitable means may be employed for this purpose. In the present construction, however, a resilient belt 27, preferably of fabric and rubber, extends between the side member 21 and rests upon the bottom plate 22 which provides a rigid support for the load. The belt 27 should be of sufficient length to extend the entire length of the body 20 or to such an extent as to receive the load of material. It is, therefore, noted that the resilient belt 27 which supports the load of material is, in turn, supported over substantially its entire under surfaces by the bottom plate 22, thereby preventing any of the material from working its way between the resilient belt 27 and the bottom plate 22. Actual tests have also disclosed that there is practically no frictional resistance created between the resilient belt 27 and the bottom plate 22, which, in any manner, interferes with the efficiency of discharging the load of material.

The forward end of the belt 27 is connected by rivets or other suitable means, to a transversely extending plate 28 which has its forward end welded or otherwise secured to the lower edge of a front end gate 29. This front end gate 29 consists of a plate 30 extending transversely between the side members 21 and is inclined rearwardly as shown in Fig. 1, the upper edge extending substantially adjacent the upper edges of the side members 21. The plate 30 is reinforced by triangularly shaped web plates 31, four of which are herein shown, spaced apart, the contacting edges of the web plates 31 being welded or otherwise secured to the plate 30 of the front end gate 29. The plate 30 has riveted or otherwise secured to its sides resilient metal scrapers 32 which have their free edges cooperating with the inner surfaces of the side members 21 to thereby remove any material which might adhere to the side members 21.

The belt 27 extends rearwardly beyond the rear end of the bottom plate 22 and passes around a drum 33 which has its ends rotatably journalled in a pair of brackets 34, welded or otherwise secured to the under surfaces of plates 35. These latter plates are welded to the upper flange of the rear I-beam 23, as shown in Fig. 1, and plates 36 have their upper edges welded to the under surfaces of the plates 35 and extend between the rear I-beam 23 and the surfaces of the brackets 34, they being welded to the lower edge of the I-beam 23 and also to the side channel members 10 of the chassis frame. The drum 33 is freely rotatable within the brackets 34 and extends substantially beyond the rear of the body 20 so as to discharge the material which is supported upon the belt 27 entirely beyond the body 20.

The forward end of the belt 27 is provided with a substantially U-shaped metal strip 37, the open ends of which are disposed upon opposite sides of the end of the belt 27 and securely riveted thereto at spaced intervals transversely thereof. This metal strip 37 has secured thereto a pair of hinges 38, spaced as shown in Fig. 3 and pivotally connected therewith are the ends of sprocket chains 39 which extend forwardly between the bottom plate 22 and the side channel members 10 of the chassis frame. At the rear portion of the chassis frame and extending transversely between the side channel members 10 and secured thereto, is a support or scraper 40 having an arcuate upper surface in cross-section, over which the sprocket chains 39 are adapted to ride. This support 40 maintains one end of the sprocket chain 39 in the desired position between the bottom plate 22 and the top of the chassis frame and, additionally, functions as a scraper or cleaner for the upper surface of the belt 27 when the front end gate 29 has been moved to the rear of the body 20 after the load of material has been discharged therefrom.

The forward portions of the sprocket chains 39 cooperate with sprocket wheels 41 which are keyed to a shaft 42 extending transversely of the chassis frame, having its outer ends journalled in brackets 43 which are welded or otherwise secured to the under side of the bottom plate 22, as clearly shown in Fig. 2. The sprocket chains 39 then pass about idle sprocket wheels 44 which are independently and rotatably supported on pins 45 mounted in brackets 45', welded or otherwise secured to the under surface of the bottom plate 22. The forward ends of the sprocket chains 39 pass upwardly through suitable openings in the bottom plate 22 at the forward end of the body 20, and extend around sheaves 46, rotatably supported in brackets 47 welded or otherwise secured to the forward surface of the plate 30. The ends of the chains are provided with bolts 48 which extend through laterally extending plates 49 welded to the plate 30 of the front end gate 29, and are adjustably connected to the plate 49 and maintained in place by nuts 50. It will, therefore, be noted that the belt 27 being connected to the front end gate 29 and to the sprocket chains 39 provides a reciprocable drive for the belt 27 and the end gate 29, and the material may be discharged by moving the sprocket chains 39 in one direction and be loaded into the body 20, by moving the sprocket chains in the other direction.

To impart movement to the sprocket chains 39, a worm gear 50 is keyed to the shaft 21 enclosed in a housing 51, which is welded or otherwise secured to the under surface of the bottom plate 22 and cooperating with the worm gear 50 is a worm 52 formed on a shaft 53 which is suitably supported at its ends in bearings, as shown in Fig. 1. The forward end 54 of the shaft 53 may be connected to any suitable take-off from the transmission gearing so that the motor speeds effected through the transmission gearing may be imparted to the worm 52 to thereby move the sprocket chains 39 at various speeds so that the material may be discharged from and loaded onto the body 20 in any desired manner.

The rear end gate 55 is provided for the purpose of maintaining the load of material within the body 20 and is of a novel construction and operation. The rear end gate 55 comprises a transversely extending plate 56 of the height of the body 20 and of substantially the width thereof. This plate 56 is provided with a plurality of spaced web plates 57 which extend vertically thereof and are welded to the rear surface of the plate 56 to securely reinforce the same, as shown in Fig. 3. To the upper end portions of the rear end gate 55 is welded a pair of laterally extending plates 58 which are pivotally connected at 59 to extensions 60 welded or otherwise secured to the upper rear ends of longitudinally extending angle slide members 61.

As shown in detail in Fig. 4, angle members 62 extend longitudinally above the uprights 24 and have their edges which are adjacent the side members 21 welded continouously thereto to provide a rigid structure. The rear edges of the angle members 62 are also welded to the uprights 24 at their points of engagement, which thereby provides an efficient guide upon which the slide members 61 are adapted to reciprocate. To space the angle members 61 from the angle members 62 and at the same time to prevent disengagement therebetween, blocks 63 are welded to the under surfaces of the angle members 61 adjacent their edges, while blocks 64 are welded to the upper surfaces of the angle members 62 in a position to lie above the blocks 63. This construction prevents the angle members 61 from moving downwardly vertically with respect to the angle members 62 and at the same time prevents the angle members 61 from being disengaged from the angle members 62. The forward ends of the angle members 61 are connected together by a transversely extending angle 65 which has its ends welded to the inner surfaces of the angle members 61 so as to maintain the ends thereof in spaced relation. This angle member 65 has one leg extending downwardly, which lies in front of the front end gate 29 and is so positioned that when the front end gate 29 is moved forwardly, the upper end will engage the depending leg of the angle 65 and through this engagement, the angles 61 are moved forwardly. This movement also causes the rear end gate 55, which is connected to the angle members 61, to be moved forwardly until it engages with the end of the body 20 to thereby close the end of the body. When the rear end gate 55 has been moved to closed position, during which time the belt 27, with the load of material, has been moved forwardly within the body 20, a rear end gate latch 66 secured to the upper surface of the belt 27 and adjacent its rear end is brought into engagement with the rear end gate 55 and securely maintains the latter in its closed position.

When it is desired to discharge the load of the material within the body 20, the sprocket chains 39 are moved in the proper direction, which would be to the left as viewed in Fig. 1, causing the load of material to be moved rearwardly with the belt 27 and at the same time the latch 66 is moved out of engagement with the rear end gate 55. Further movement of the load of material upon the belt 27 causes the material to engage with the rear end gate 55 and the pressure exerted upon the latter causes the angles 61 to slide upon the angles 62 moving the end gate outwardly away from the load of material which is being discharged.

The arrangement herein described has many advantageous features as will be readily observed but among which are the more important of being able to discharge the load of material at various speeds and in the desired quantities. The operation of the discharging of the material is always under the control of the operator so that the entire load of material may be discharged at once or portions thereof may be discharged at different intervals. This feature as readily applies to the loading of the material within the body 20 where especially selective delivery is desired, in that the material which is to be last discharged may be first placed upon the belt 27 adjacent the front end gate 29 when the latter is adjacent the rear of the body 20. The belt may then be advanced toward the front while the other material is loaded on in sequence.

Another advantage in the manner of discharging the load of material is due to the fact that the body 20 is not elevated as is the case in most dump body constructions but is rather rigidly secured to the chassis frame, thereby providing a much more rigid construction. This arangement also enables the center of gravity to be maintained at a low point which enables the material to be discharged efficiently under various conditions, especially where it is desired to discharge the load when the vehicle is on a slope.

While I have described the preferred embodiment of the invention, it is to be understood that I am not to be limited thereto inasmuch as various changes and modifications may be resorted to without departing from the spirit of the invention as is defined in the appended claims.

Having thus described my invention, I claim:

1. A dump body comprising side members, a bottom member extending between said side members, a movable material supporting member extending longitudinally of said body, a front end gate attached to said material supporting member, a rear end gate, and means connected with said rear end gate and engaged by said front end gate for moving said rear end gate to its closed position.

2. A dump body comprising side members, a bottom member extending between said side members, a movable material supporting member extending longitudinally of said body and resting upon said bottom member, a front end gate attached to said movable member, a rear end gate slidably mounted on said body and having portions engaged by said front end gate for moving said rear end gate to its closed position.

3. A dump body comprising side members, a bottom member extending therebetween, a front end gate movable longitudinally between said side members, and a rear end gate slidably mounted with respect to said side members and having portions engaged by said front end gate for moving said rear end gate to its closed position.

4. In a dump body, a transversely extending material supporting member movable longitudinally within said body, an end gate adapted to close the end of said body, and means connected to said end gate and engaged by said material supporting member for moving said end gate to its closed position.

5. In a dump body, a transversely extending member movable within said body, an end gate adapted to close the end of said body, means slidably mounted on said body and connected with said end gate, and cooperating means between said transversely extending member and said slidable means for moving said end gate to its closed position.

6. In a dump body, a transveresly extending member movable therein, guide means associated with said body, slide means cooperating with said guide means, a rear end gate connected with said slide means, and means carried by said slide means and engaged by said transversely extending member for moving said rear end gate to its closed position.

7. In a dump body, a transversely extending member movable therein, guides extending longitudinally of said body, slides cooperating with said guides, a rear end gate connected with said slides, and means carried by said slides engaged by said transversely extending member for moving said rear end gate to its closed position.

8. In a dump body, a transversely extending member disposed therein, means for moving said member within said body, guides extending longitudinally of said body, slides cooperating with said guides, an end gate pivotally connected to said slides, means carried by said slides and engaged by said transversely extending member for moving said end gate to its closed position, and means movable with said transversely extending member and engageable with said end gate when the latter is in closed position.

WILLIAM G. WEHR.